2,821,963

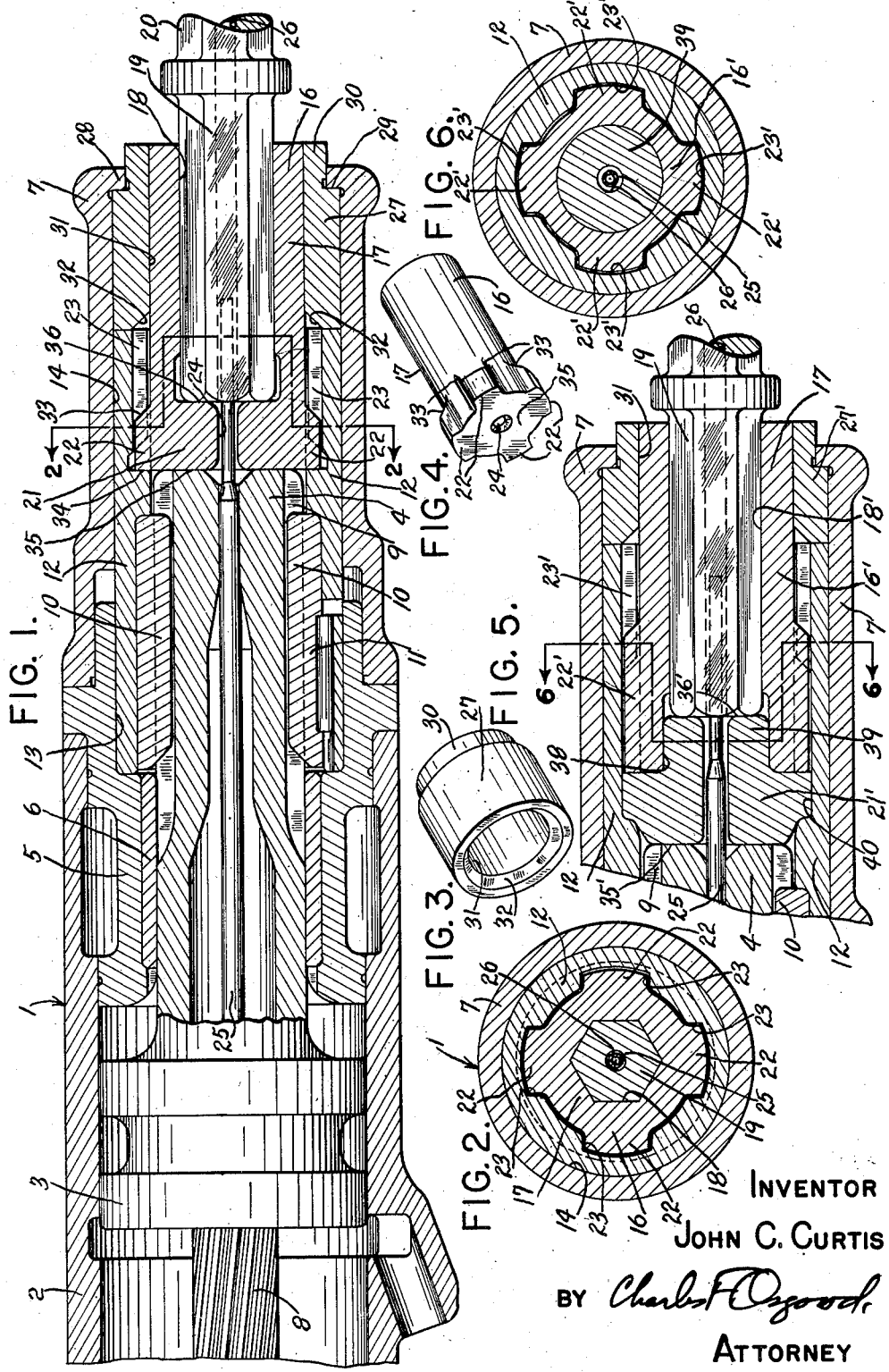
Feb. 4, 1958 — J. C. CURTIS — 2,821,963
CHUCK MECHANISM FOR A STOPER ROCK DRILL
Filed Oct. 21, 1952
INVENTOR
JOHN C. CURTIS
BY Charles F. Osgood
ATTORNEY

# United States Patent Office 2,821,963
Patented Feb. 4, 1958

CHUCK MECHANISM FOR A STOPER ROCK DRILL

John C. Curtis, Newport, N. H., assignor to Joy Manufacturing Company, Pittsburgh, Pa., a corporation of Pennsylvania Application October 21, 1952, Serial No. 315,999

1 Claim. (Cl. 121—32)

This invention relates to rock drills and more particularly to an improved chuck mechanism for a hammer rock drill of the stoper type especially designed for use in drilling upright overhead holes.

In a stoper rock drill, and particularly in a stoper drill of the roof bolting type such as is commonly employed in underground coal mines, it is highly desirable to keep the overall length of the drill at a minimum. In such drills, which may be either of the dry or the wet type, considerable difficulty has been encountered, while maintaining minimum overall length, in sealing out foreign matter, such as cuttings, grit and water, from the internal chuck parts, and since such seals have heretofore not been completely effective considerable wear has occurred resulting in considerable air leakage and in decreased drilling efficiency. Also, some difficulty has been encountered in such rock drills in the maintenance of alignment between the moving chuck parts such as the tappet, chuck bushing and chuck sleeve. The present invention contemplates improvements over known types of stoper rock drills in that the difficulties have outlined are substantially overcome. In accordance with the present invention the tappet or striking block has been combined with the sliding chuck bushing and is guided for reciprocatory movement in a stationary front bushing fixed within the front chuck housing so that not only is the combined tappet and bushing adequately supported and guided but also an effective seal due to the large bearing surfaces is provided which prevents foreign matter, such as cuttings, grit and water, from flowing into the interior of the chuck mechanism. By combining the tappet with the sliding chuck bushing and by guiding the same within the bore of a stationary wear bushing, the overall length of the drill is maintained at a minimum. The improved chuck mechanism is relatively simple and rugged in design, well adapted for its intended purpose.

It is accordingly the primary object of the present invention to provide an improved chuck mechanism for a stoper rock drill wherein the overall length of the drill is maintained at a minimum and the moving chuck parts are effectively guided and sealed against foreign matter thereby to reduce wear and increase drilling efficiency. Another object is to provide an improved combined tappet and sliding chuck bushing construction. Yet another object is to provide an improved rock drill chuck mechanism wherein the number of the moving parts is reduced, resulting in simplification and increasing durability. A further object is to provide an improved sliding chuck bushing and tappet construction for a hammer rock drill together with improved guiding and sealing means therefor. These and other objects and advantages of the invention will, however, hereinafter more clearly appear in the course of the ensuing description.

In the accompanying drawing there are shown for purposes of illustration one form and a modification which the invention may be assumed in practice.

In this drawing:

Fig. 1 is a view in central longitudinal section taken through a hammer rock drill in which an illustrative form of the improved chuck mechanism is embodied.

Fig. 2 is a cross section taken on the planes of line 2—2 of Fig. 1.

Fig. 3 is a perspective view of the guide bushing.

Fig. 4 is a perspective view of the combined tappet and sliding chuck bushing.

Fig. 5 is a fragmentary view, taken on the plane of Fig. 1, illustrating a modified construction.

Fig. 6 is a cross section taken on the planes of line 6—6 of Fig. 5.

The hammer rock drill in which the invention is embodied is generally designated 1 and comprises a conventional fluid actuated hammer motor having a cylinder 2 containing a reciprocable hammer piston 3, the latter having a forwardly projecting striking bar 4. The motor cylinder has a usual front buffer ring or head 5 provided with a bore in which a wear bushing 6 is fitted for guiding the piston striking bar during reciprocation of the hammer piston, and secured to the cylinder is a front chuck housing 7 which is suitably held in engagement with the front cylinder head, as shown in Fig. 1. The hammer piston, as is usual in rock drills of the type disclosed, is intermittently rotated as it reciprocates, and a spirally grooved rifle bar 8 is slidingly interlocked within the piston, and rifle bar movement is controlled automatically by a conventional ratchet and pawl mechanism (not shown). The piston striking bar has straight longitudinal grooves 9 which are slidingly interlocked with straight splines or lugs 10 of a conventional chuck nut 11 secured, as by a key, within a rotatable chuck sleeve 12, the latter being rotatably mounted in axially aligned bores 13 and 14 of the front cylinder head 5 and chuck housing 7 respectively. Thus, as the hammer piston reciprocates within the motor cylinder the chuck sleeve 12 is intermittently rotated.

Now referring to the improved chuck mechanism it will be noted that a combined tappet or striking block and sliding chuck bushing 16 has an elongated forward cylindrical portion 17 formed with a hexagonal socket 18 for receiving the polygonal shank 19 of a conventional collared rock drill steel 20. Formed rearwardly of the cylindrical portion 17 of the combined tappet and chuck bushing 16 is a rearward transverse solid portion 21 formed exteriorly with lateral key projection, splines or lugs 22 which are slidingly interlocked within longitudinal grooves or keyways 23 formed within the forward portion of the rotatable chuck sleeve 12. The rearward portion 21 of the combined tappet and chuck bushing 16 is axially perforated at 24 and a conventional cleansing fluid conducting tube 25 extends axially through the rifle bar and hammer piston and through the axial perforation 24 into the rearward portion of the axial bore 26 of the drill steel 20, and this tube may conduct either fluid under pressure or water through the drill steel for hole cleansing purposes in a well-known manner.

In this improved construction a front wear bushing 27 has a press fit within the forward portion of the bore 14 of the chuck housing 7 and the chuck housing has an inwardly directed, internal, annular flange 28 which provides a rearwardly facing shoulder against which a shoulder 29 on the wear bushing abuts, as shown in Fig. 1, and the wear bushing has a reduced forward circular portion 30 which extends axially through and has a close running fit with the bore of the annular flange 28. This wear bushing 27 has a straight uniform bore 31 which has a close sliding fit with the forward cylindrical portion 17 of the combined tappet and chuck bushing 16, thus providing a large bearing surface for the chuck bushing and affording an effective dirt seal between the parts. The rear end of the bore 31 of the wear bushing 27 is desirably chamfered or tapered at 32 and the keys or lugs 22 of the sliding bushing 16 are formed with inclined forwardly facing surfaces 33 which conform with the tapered surface 32 of the wear bushing and move into contact with the surface 32 when the sliding bushing 16 is in its foremost position. The sliding bushing 16, when in its rearmost position, abuts at 34 a shoulder within the chuck sleeve rearwardly of the splineways 23 for limiting the inward movement of the bushing.

The rock drill in Fig. 1 is for illustrative purposes shown in a horizontal position but in actual use as a stoper extends vertically to enable drilling of vertical overhead holes. As the hammer piston 3 reciprocates within the motor cylinder the piston striking bar 4 imparts a rapid series of impact blows to the rear end surface 35 of the combined tappet and chuck bushing 16 and the solid tappet portion 21 has a forwardly facing internal impact surface 36 which transmits the impact blows of the piston striking bar to the rear end of the shank 19 of the drill steel thereby to percussively actuate the latter to effect drilling of a hole. As the hammer piston reciprocates it is intermittently rotated by the ratchet and pawl controlled rifle bar 8 and the intermittent piston rotation is transmitted through the chuck nut 11 and chuck sleeve 12 and through the splines 23 and keys 22 of the sliding bushing to the drill steel intermittently to rotate the latter as it is percussively actuated. During reciprocation of the hammer piston the combined tappet and chuck bushing 16 slides freely axially relative to the chuck sleeve while the tappet and bushing is at all times maintained slidingly interlocked with the chuck sleeve through the keys and splineways.

In the modified construction shown in Figs. 5 and 6 it will be noted that the parts of the chuck mechanism are essentially the same as those of the embodiment above described and are designated by similar reference numerals. In this instance, however, the chuck sleeve 12 has elongated splineways 23' which are slidingly interlocked with elongated keys or lugs 22' formed on a combined tappet and sliding chuck bushing 16'. The elongated cylindrical portion 17 of the sliding bushing is slidingly mounted within and has a close running fit with the bore 31 of a front wear bushing 27' firmly secured within the chuck housing. The combined tappet or striking block and sliding chuck bushing 16' is, in this instance, composed of two separable parts comprising a forward chuck bushing part 16' and a rearward tappet part 21' and the bushing is formed at its rearward portion with an axial bore 38 within which a forward cylindrical projection 39 on the tappet has a tight press fit. The bushing part 16' has extending axially therethrough a hexagonal bore 18' which slidingly receives the shank 19 of the drill steel. The tappet part 21' has a cylindrical body which may have a sliding fit within a bore 40 within the chuck sleeve 12 so that the combined tappet and sliding bushing may be adequately guided at its opposite ends although guiding of the bushing solely by the front wear bushing is desirable since exact alignment, with such a construction, of the chuck sleeve and chuck bushing is unnecessary. The replaceable tappet part 21' has a rearwardly facing impact receiving surface 35' and the forward cylindrical projection 39 provides a forwardly facing impact surface 36' and, as in the embodiment above described, the piston striking bar 4 is adapted to deliver a series of rapid impact blows to the tappet surface 35' and the tappet part transmits these blows through the impact surface 36' to the rear end of the steel shank 19. As in the other embodiment the combined tappet and chuck bushing has free sliding movement relative to the chuck sleeve while it is maintained in sliding interlocking engagement with the chuck sleeve. By making the tappet part 21' separable from the bushing part 16' it is possible to broach the bore 18' completely through the bushing, and the separate tappet part may be readily replaced when it becomes worn or broken. Otherwise this embodiment is similar to that above described.

As a result of this invention an improved chuck mechanism is provided for a stoper type rock drill wherein the overall length of the drill is kept at a minimum and the internal chuck structure is adequately sealed against entry of dirt or other foreign matter. By combining the tappet with the sliding chuck bushing not only is the length of the drill maintained at a minimum but also the drill structure is simplified and durability is increased. By slidingly mounting the forward cylindrical portion of the combined tappet and sliding chuck bushing within the uniform straight bore of a stationary wear bushing, not only is an effective seal between the parts provided but also an improved bearing mounting for the bushing is afforded. These and other advantages of the invention will be clearly apparent to those skilled in the art.

While there are in this application specifically described one form and a modification which the invention may assume in practice, it will be understood that this form of the same is shown for purposes of illustration and that the invention may be further modified and embodied in various other forms without departing from its spirit or the scope of the appended claim.

What I claim as new and desire to secure by Letters Patent is:

In combination, a motor cylinder containing a reciprocatory hammer piston, a front chuck housing secured to said cylinder and having a forward bore, a cylindrical front wear bushing secured within the forward portion of said housing-bore, a rotatable chuck sleeve having a cylindrical forward portion rotatably mounted within said housing-bore rearwardly of said wear bushing, a combined rotative and reciprocatory tappet and chuck bushing having a cylindrical exterior surface at its forward portion and adapted to receive the impact blows delivered by said piston, said combined tappet and chuck bushing having a socket for slidingly receiving the shank of a reciprocatory drill steel and relative to which said steel-shank has free reciprocatory sliding movement during the percussive actuation thereof, said combined tappet and chuck bushing having its forward portion slidingly guided within said front wear bushing with the latter providing the sole bearing support for said combined tappet and chuck bushing, said combined tappet and chuck bushing extending freely rearwardly from said wear bushing into the bore of said chuck sleeve, and means at the rearward portion of said combined tappet and chuck bushing providing a relatively loosely fitted sliding interlocking connection between said combined tappet and chuck bushing and the forward portion of said chuck sleeve whereby said combined tappet and chuck bushing may slidingly reciprocate freely relative to said chuck sleeve as it rotates in unison with the latter, said front wear bushing having a bore of substantial length and said combined tappet and chuck bushing having its forward portion elongated and slidingly guided in and having a close sliding fit with said wear-bushing-bore whereby said combined tappet and chuck bushing is at all times adequately guided and supported entirely by said wear bushing while such sliding fit provides an effective dirt seal between the parts.

References Cited in the file of this patent

UNITED STATES PATENTS

| | | |
|---|---|---|
| 2,458,289 | Morrison | Jan. 4, 1949 |
| 2,608,180 | Curtis | Aug. 26, 1952 |
| 2,608,181 | Curtis et al. | Aug. 26, 1952 |
| 2,608,413 | Peck | Aug. 26, 1952 |